Figure 2:
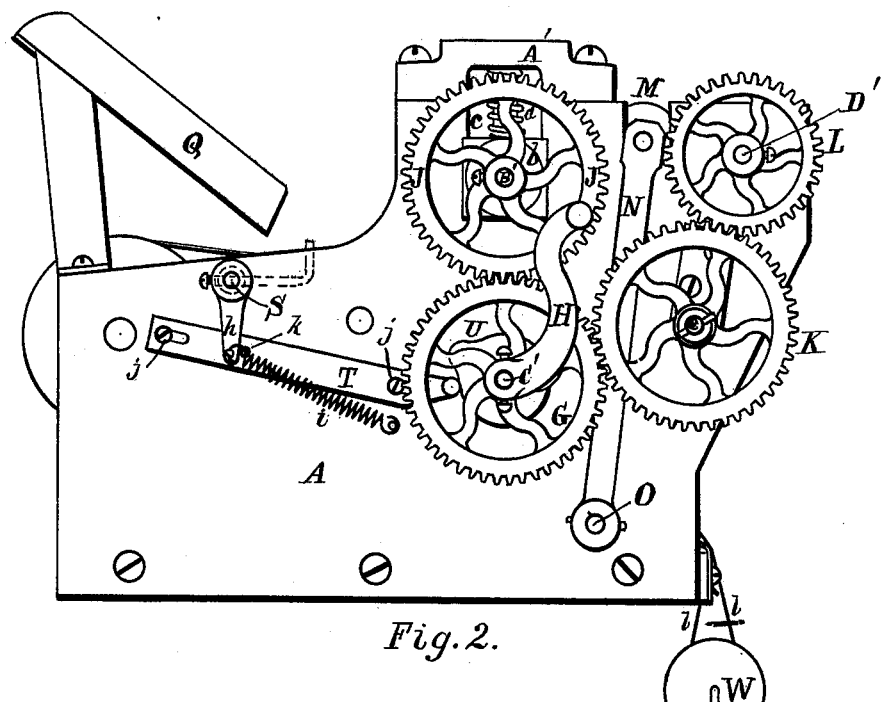

3 Sheets—Sheet 1.

T. & M. LEAVITT.
ROTARY POST MARKING AND CANCELING PRESS.

No. 175,290. Patented March 28, 1876.

Witnesses.
N. C. Lombard
B. Andrews. Jr.

Inventors.
Thomas Leavitt
Martin Leavitt

3 Sheets—Sheet 2.

T. & M. LEAVITT.
ROTARY POST MARKING AND CANCELING PRESS.

No. 175,290. Patented March 28, 1876.

Witnesses.
N. C. Lombard
B. Andrews, Jr.

Inventors.
Thomas Leavitt
Martin Leavitt

T. & M. LEAVITT.
ROTARY POST MARKING AND CANCELING PRESS.

No. 175,290. Patented March 28, 1876.

Witnesses.
N. C. Lombard
B. Andrews, Jr.

Inventors.
Thomas Leavitt
Martin Leavitt

UNITED STATES PATENT OFFICE.

THOMAS LEAVITT, OF EVERETT, AND MARTIN LEAVITT, OF MELROSE, MASSACHUSETTS, ASSIGNORS TO THOMAS LEAVITT, TRUSTEE.

IMPROVEMENT IN ROTARY POSTMARKING AND CANCELING PRESSES.

Specification forming part of Letters Patent No. 175,290, dated March 28, 1876; application filed September 28, 1875.

*To all whom it may concern:*

Be it known that we, THOMAS LEAVITT, of Everett, and MARTIN LEAVITT, of Melrose, both in the county of Middlesex and State of Massachusetts, have jointly invented certain new and useful Improvements in Machines for Postmarking Letters and Canceling the Stamps on the same, of which the following, taken in connection with the accompanying drawings, is a specification:

Our invention relates to a machine for postmarking and canceling letters, in which the type for marking and canceling are arranged upon the periphery of a cylinder which rolls in contact with another cylinder for giving the impression; and it consists, first, in the use of tapes for feeding the letters to the printing-cylinders, one or more of which passes around one of said cylinders, in combination with one or more intermittently-vibrating fingers or stops arranged by the side of or between said tapes or belts, and adapted to intercept the forward movement of the letter and release it at a given or determined time, thus accurately registering the letter relative to the type on the type-cylinder, so that the printing will always be done on the same portion of the letter.

Our invention further consists in the use, in combination with a type-cylinder, an impression-cylinder, tapes for feeding the letters to the cylinders, one or more of which passes around one of said cylinders, and intermittently-vibrating stops arranged by the side of or between said tapes, of an inclined chute placed above said tapes, with its lower end at right angles to the line of motion thereof, and nearly in contact therewith a little in the rear of said vibrating stops, upon which the letters are placed, one at a time, by the operator, with the stamped side in proper relation to the type-cylinder.

Our invention further consists in the use of one or more tapes or endless belts passing around the impression-cylinder, by which it or they are operated, and extending therefrom to and surrounding another cylinder, or one or more pulleys placed beneath the inclined chute, in combination with one or more tapes or endless belts surrounding said cylinder under the inclined chute, and extending therefrom to and surrounding another cylinder, or one or more pulleys placed just in the rear of the impression-cylinder, the upper horizontal portions of all of said tapes being in the same plane, and serving together as an apron for conveying the letters to the printing-cylinders without being exposed to the impression of the type in case the machine is operated without passing an article to be printed through the machine.

Our invention further consists in constructing the impression-cylinder with a portion of its length cylindrical in form to receive the conveying-tapes, and another portion of its length, near one end, having a portion of its periphery, opposite the point where the type upon the type-cylinder bears, cut away to a smaller diameter, so that there shall be no contact between said cylinders upon the end where the printing is done, except while the impression is being made upon the letter, or while the type is passing over the impression-cylinder.

Our invention further consists in the use, in a stamp-canceling, postmarking, or other printing machine provided with a cylinder or segment of a cylinder to receive the impression, of a blotter-belt or endless band passing between said impression-cylinder and the type-cylinder, and arranged to move with and at the same speed as the impression-cylinder while the type is in contact therewith, and remain in a state of rest during the remainder of the revolution of said cylinder, so that said blotter-belt shall be fed forward at each revolution of the type and impression-cylinders a distance only equal to the length of the periphery of said type-cylinder occupied by the type, notwithstanding that the type may occupy only a small portion of the periphery of the cylinder, the object of the use of said belt being to prevent blotting or smutching the back of the letter or envelope by ink deposited upon the impression-cylinder by failure of the operator to feed an envelope to the machine at each and every revolution of the printing-cylinders.

If the operator fails to supply a letter or envelope or other article to be printed to the machine at each revolution of the cylinders, when the blotter-belt is used, the impression is taken upon the belt, and that portion of the belt upon which the impression is taken is moved forward, by the act of taking said impression, into a position where the next letter or other article fed to the printing-cylinders will not come in contact with the inked portion of said belt, each succeeding impression being taken upon a different part of said belt till it has made a complete revolution, and, as the belt may be of an indefinite length, it is obvious that, before that portion of the blotter-belt which has been accidentally inked again comes into position between the printing-cylinders, the ink deposited thereon will have become sufficiently dried to prevent it from being transferred to the article being printed.

Our invention further consists in the combination, in a stamp-canceling, postmarking, or other printing machine, of an impression-cylinder having a portion of its periphery cut away, or a segment of a cylinder, an endless blotter-belt arranged to partially surround and hang loosely by one of its loops from said cylinder or segment, and a suitable friction device applied to said belt at a point preceding its coming in contact with said impression-cylinder, to insure its passing onto said cylinder smoothly, or without wrinkle or unevenness.

Our invention further consists in the use, in combination with a blotter-belt applied to an impression cylinder or segment, as set forth, of a pin or guide to hold up the slack of said belt as it leaves the cylinder, and a weighted pulley or equivalent device applied to the lever loop or bight of said belt, for the purpose of keeping it extended and preventing the belt, after it leaves the cylinder or segment, from accidentally being doubled and drawn under and around the cylinder before its proper time.

Figure 1:
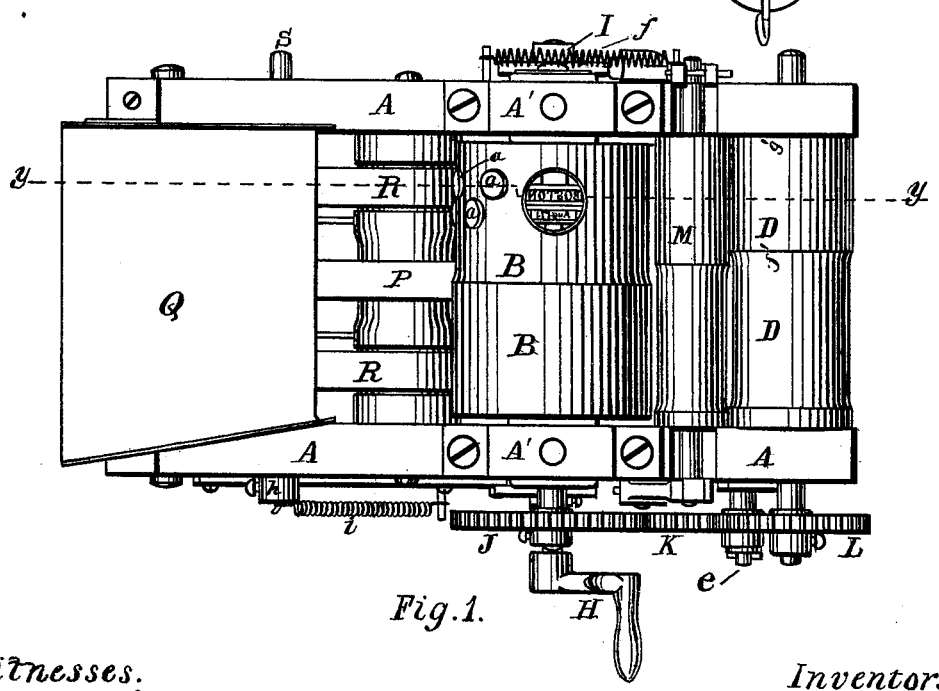
Figure 3:
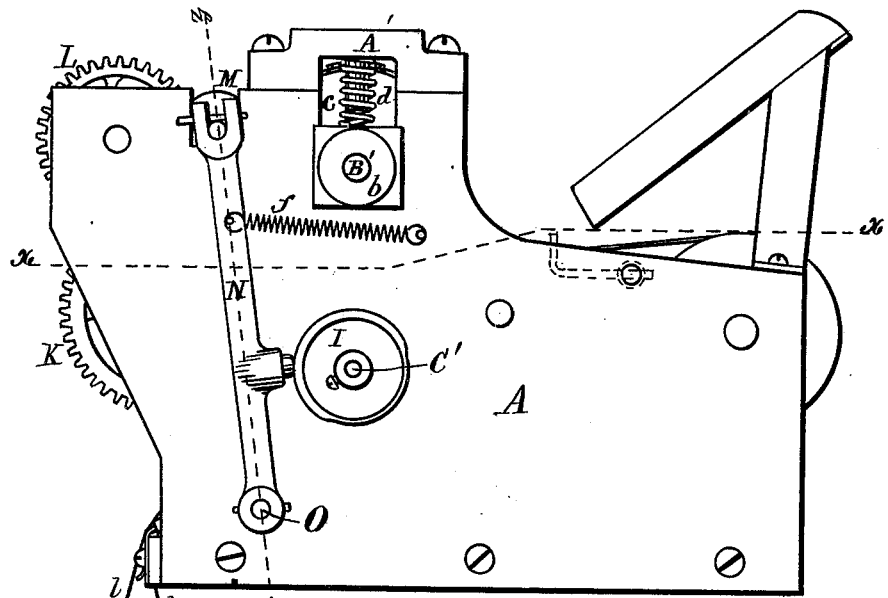
Figure 4:
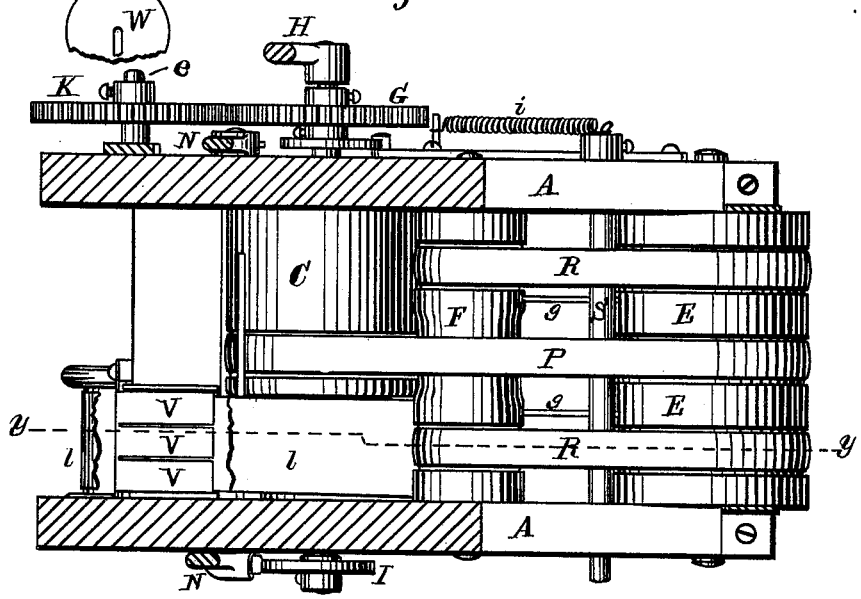
Figure 6:
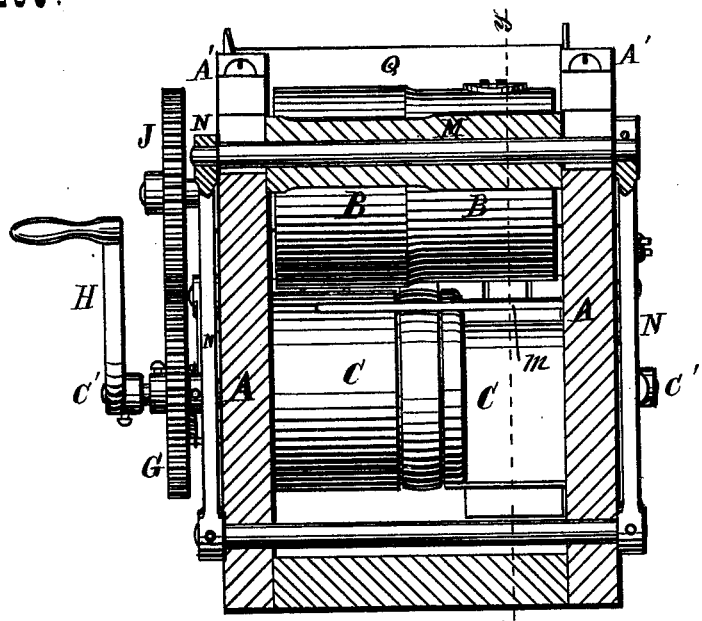
Figure 5:
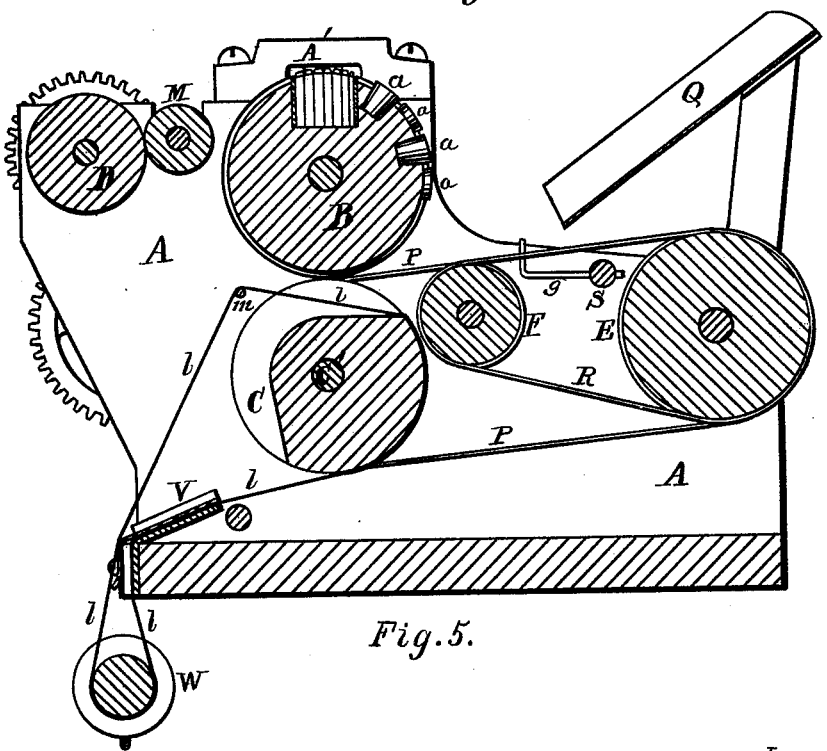

Figure 1 of the drawings is a plan of a machine embodying our invention. Fig. 2 is a side elevation. Fig. 3 is an elevation of the side opposite to that shown in Fig. 2. Fig. 4 is a horizontal section on line $x\ x$ on Fig. 3. Fig. 5 is a longitudinal section on line $y\ y$ on Figs. 1, 4, and 6, and Fig. 6 is a transverse section on line $z\ z$ on Fig. 3.

In the drawings, A is the frame of the machine; B, the type-cylinder; C, the impression-cylinder; D, the ink-distributing cylinder; and E F are two tape cylinders or rolls, all of which are mounted in suitable bearings in the frames A A. The shaft C' of the impression-cylinder C extends through the frames A, and has secured to one end thereof the spur-gear wheel G and crank H, or a pulley may be substituted for said crank, if it is desirable to have the machine operated by other than hand-power, and upon the other end of said shaft is secured the cam I. The cylinder B is provided near one end with a circular recess in its periphery, in which is secured, in any suitable manner, the necessary type to indicate the place and date of mailing a letter, and said cylinder also has secured to its periphery, in any suitable manner, one or more printing blocks or type, $a\ a$, of any desired exterior form or design, and made of rubber, cork, or other elastic material, or of type-metal, as preferred, for the purpose of canceling the stamps upon the letters.

The shaft of the cylinder B has its bearings in the boxes $b\ b$, fitted to slide up and down in the slots $c\ c$, formed in the frames A for the purpose, and the cylinder B is forced downward upon the impression cylinder C by the springs $d\ d$, placed between the boxes $b\ b$ and the caps A' of the frames A, by compressing which the cylinder B may be made to yield, to adapt itself to letters of different thickness. J is a spur-gear wheel secured to the end of the shaft B' of the cylinder B, of the same diameter and number of teeth as G, with which it engages, and by which it is operated to impart a rotary motion to the type-cylinder, the periphery of which moves with the same speed as the cylinder C, said type and impression cylinders being of equal diameters. The gear-wheel G also engages with and imparts motion to the intermediate gear K, mounted upon the fixed stud or journal $e$, and arranged to engage with and impart motion to the spur-gear wheel L, secured to the shaft D' of the ink-distributing cylinder D, the axis of which is located nearly on a level with the axis of the type-cylinder B.

The ink-distributing cylinder D is to be covered with cloth, rubber, or other suitable elastic material, for so much of its length as is to be used for distributing ink, say from $f'$ to $g'$, Fig. 1.

M is an inking-roller, to be made of the usual composition, or of any other suitable material, said roll being placed between the type and ink-distributing cylinders, as shown in Figs. 1 and 5, and mounted in suitable bearings in the upper ends of the two arms N N, arranged one upon either side of the machine, and firmly secured at their lower ends to the rocker-shaft O, extending across the machine, and having its bearings in the frames A. An intermittent vibratory motion is imparted to roller M and its carrying-frame by means of the cam I and spring $f$, acting upon one of the arms N, as shown in Fig. 3, the whole being so constructed and arranged that the roller M is thrown in contact with the ink-distributing cylinder D, and held in contact therewith while the type on the type-cylinder are passing from a position on the top of said cylinder to a point nearly opposite, by the action of said cam I, and then is thrown in contact with the type-cylinder, and retained in contact therewith until the type on said cylinder have passed said roll, by the action of the spring $f$. P is a tape or endless belt of any suitable material, which passes around the impression-cylinder C, and extends to and around the cylinder E, placed at the extreme end of the frames beneath the chute Q. This tape or belt, (one or more of which may be used,) placed upon that portion of the impression-cylinder not subject to the action of the type, serves the purpose of feeding the article to be printed to the printing-cylinders, and, by virtue of its passing around the impression-cylinder, insures a regular and uninterrupted passage of the letters or other articles through the machine without the use of nippers, and also serves as a means of transmitting motion to the cylinder E.

R R are similar tapes or belts connecting the cylinders E and F, and arranged with their upper portions in the same plane with the band P, and move at the same speed and in the same direction as P, and serve with the band P to form a broad bearing-surface to receive the letter, envelope, or other article as it slides down the inclined chute Q, and to guide it to the printing-cylinders. The cylinder F is placed in close proximity to the impression-cylinder, and the tapes R do not pass around the impression-cylinder, as it is not necessary to the proper feeding of the letters to the cylinders; and there is a great advantage in not passing the tape R, which lies upon that side of the machine where the impression is taken, around the impression-cylinder, for the reason that it would be constantly liable to have ink deposited upon it, which would be transferred to the back side of a succeeding letter and disfigure it. S is a rocker-shaft, mounted in suitable bearings in the frames A A, and provided with one or more bent arms or fingers, $g$ $g$, so arranged that their ends project a short distance above the top surfaces of the tapes P and R, a short distance in front of the lower end of the chute Q, in position to intercept the forward motion of the letter as it falls onto the tapes from the chute Q, where the letters are deposited by the operator one by one. The shaft S has secured thereto upon the outside of the frame a lever, $h$, to the movable end of which is connected a spring, $i$, which serves to hold the fingers $g$ $g$ in position, with their ends projecting above the tapes, as shown in Figs. 2 and 5. T is a plate or bar fitted to slide upon the pins or screws $j$ $j$, passing through slots formed thereon and provided with a pin, $k$, projecting therefrom in position to engage with the lower end of the lever $h$. A reciprocating motion is imparted to the plate T by the combined action of the cam U, secured to the shaft of the impression-cylinder C, and the spring $i$, and the pin $k$, acting upon the lever $h$ impart a rocking or vibratory motion to the shaft S and the fingers $g$ $g$, so that at the proper time said fingers are swung down below the upper surface of the tapes P and R, releasing the letter or envelope which may be resting against them, and allowing it to be carried forward by the tapes to be seized by the cylinders and printed.

The impression-cylinder C has a portion of its periphery, at the end where the printing is to be done, cut away, as shown in Figs. 5 and 6, and around that portion of said cylinder is passed the endless belt $l$, made of any suitable flexible material and any desirable length. The object of the belt $l$ is to receive the impressions from the type whenever the machine is in operation and the operator fails to supply it with an article to be printed at each revolution of the printing-cylinders.

By virtue of the reduced diameter or radius of the periphery of the impression-cylinder upon the side opposite to where the impression is to be taken, the belt $l$ is moved forward only while the impression is being taken, and remains in a state of rest during the remaining portion of each revolution, by which means a much shorter belt will answer the purpose than if the belt were moving all of the time.

V is a spring friction device through which the lower portion of the belt $l$ passes prior to its passing on to the cylinder C, which serves to keep it extended and cause it to pass onto the cylinder smoothly.

W is a weighted pulley placed within the lower fold or bight of the belt $l$, and held in position by side flanges, the purpose of which pulley is to keep the belt extended and acting in conjunction with the guide-pin $m$ set in one of the frames A, and over which the upper part of the belt $l$ passes after leaving the cylinder, to prevent the belt from being accidentally doubled and passed around the cylinder, or entangled therewith.

The belt $l$ may be of any desired length, and may be arranged, as shown, in connection with a cylinder having a portion of its periphery cut away, or where sufficient length of belt can be obtained the cylinder may be a full circle and the belt be arranged to move all the time, it only being necessary to have the length of the belt sufficient to permit any ink which may be deposited thereon by the type to become sufficiently dried before the same place again comes between the cylinders, to prevent it from being transferred to the back of the letter and disfiguring it. It is also obvious that the type and impression cylinders may be transposed, or change places, without affecting the principles of operation, in which case the long feeding tapes or belts would pass around the type-cylinder, instead of the impression-cylinder, as here shown and described. It is also obvious that this machine may be used for printing cards, envelopes, and for other purposes.

What we claim as our joint invention, and desire to secure by Letters Patent of the United States, is—

1. The combination, in a stamp-canceling, postmarking, or other printing machine, of a type-cylinder, an impression-cylinder, one or more tapes or endless belts passing around and operated by one of said cylinders, and adapted to feed the letter or other article to be printed to said cylinders, and one or more intermittently-operated stops arranged by the side of or between said tapes, and adapted to intercept the forward motion of the article to be printed and release it at a given or determined time, as and for the purpose described.

2. The combination, in a stamp-canceling, postmarking, or other printing machine, of a type-cylinder, impression-cylinder, one or more tapes or endless belts, one or more of which passes around one of said cylinders, and adapted to feed the article to be printed to said cylinders, one or more intermittently-operated stops arranged by the side of or between said tapes, and an inclined chute placed above said tapes, with its lowest edge at right angles to the line of movement of said tapes, all arranged and adapted to operate as and for the purposes described.

3. The combination of one or more tapes or endless belts, P, passing over and around the cylinders C and E, and one or more tapes or endless belts, R, passing over and around the cylinders E and F, with their upper portions in the same plane with the tapes P, all arranged and operating substantially as described.

4. An impression-cylinder, made in one piece and adapted to receive the impression directly upon its surface near one end, having that portion of its periphery opposite where the impression is taken cut away or made in the form of a segment of a cylinder, in combination with a type-cylinder arranged to revolve in unison therewith, and one or more feed-tapes passing around one of said cylinders, substantially as described.

5. In combination with a type-cylinder and an impression-cylinder having a portion of its periphery, opposite where the impression is taken, cut away or reduced, an endless blotter-belt passing between said cylinders and around the impression-cylinder, from which it hangs loosely by one of its loops in position to receive the impression thereon, and arranged to be intermittently fed between said cylinders, as and for the purpose described.

6. In combination with the cylinder C, having a portion of its periphery cut away or reduced in diameter, and a blotter-belt arranged to surround and hang loosely by one of its loops from said cylinder, a friction or retarding device applied to said belt at a point preceding its coming in contact with said cylinder, as and for the purpose described.

7. The combination of the type and impression-cylinders B and C, the endless blotter-belt l, arranged to hang loosely by one of its loops from the cylinder C, and the weighted pulley W applied to lower loop or bight thereof, as and for the purposes described.

8. The combination of the cylinder C, blotter-belt l, and guide-pin m, arranged and adapted to operate substantially as described for the purposes specified.

Executed at Boston this 25th day of September, 1875.

THOMAS LEAVITT.
MARTIN LEAVITT.

Witnesses:
N. C. LOMBARD,
B. ANDREWS, Jr.